May 20, 1958 R. ROSEBROOK 2,835,466
TRACER MECHANISM
Filed Oct. 5, 1953 3 Sheets-Sheet 1
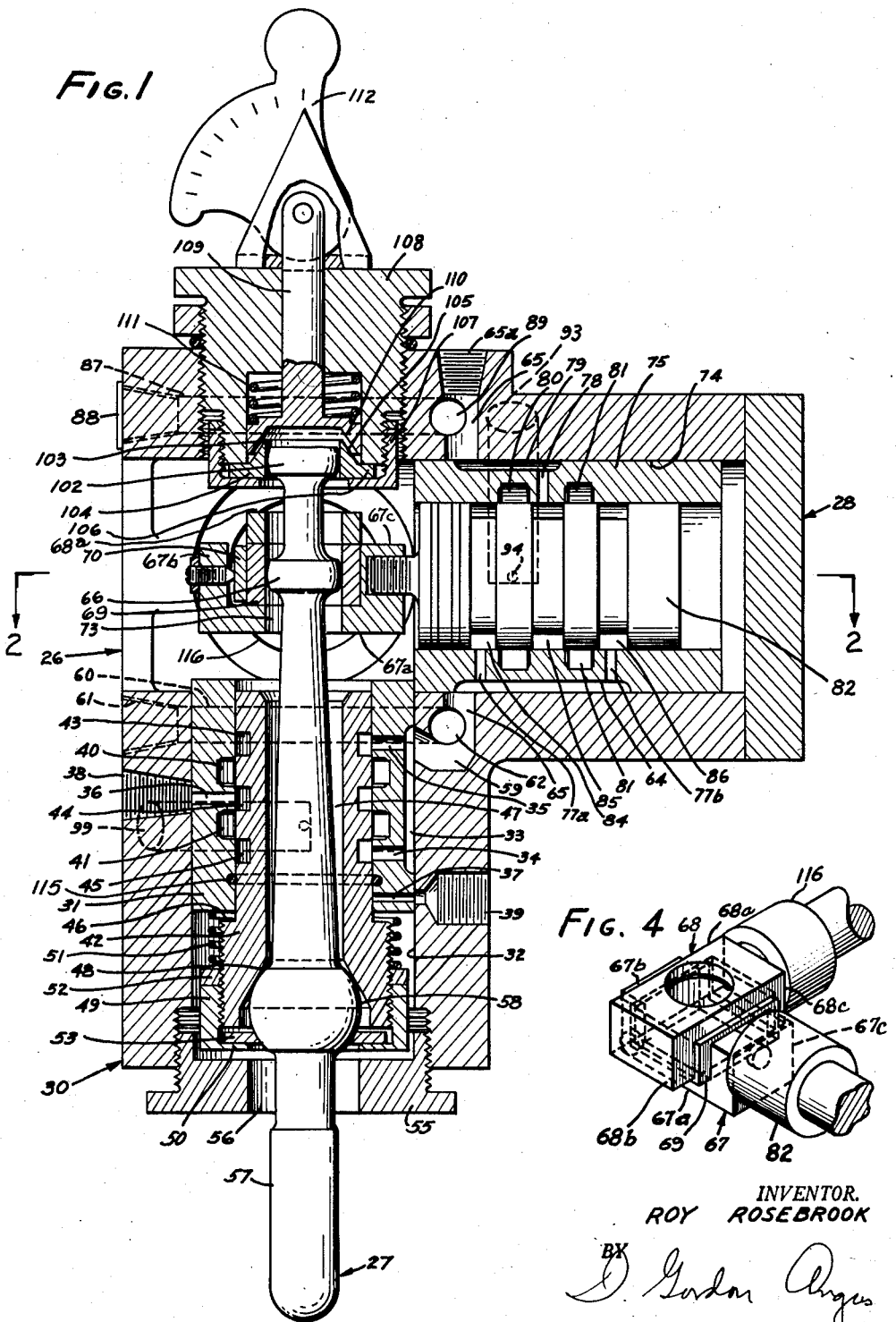
INVENTOR.
ROY ROSEBROOK
BY
ATTORNEY.

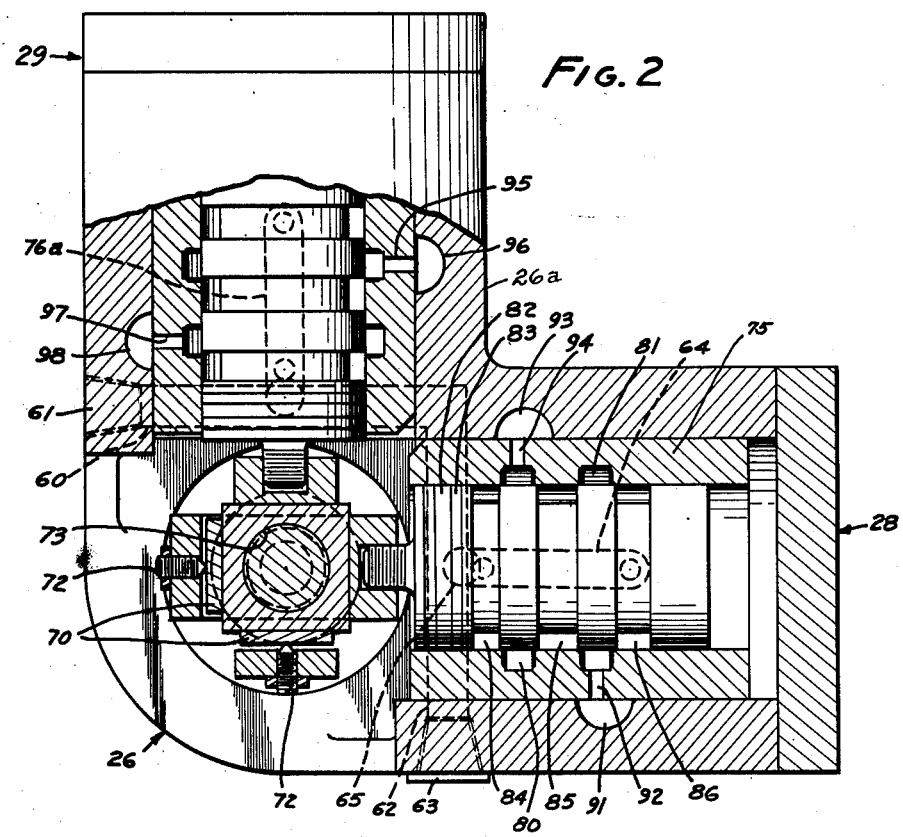
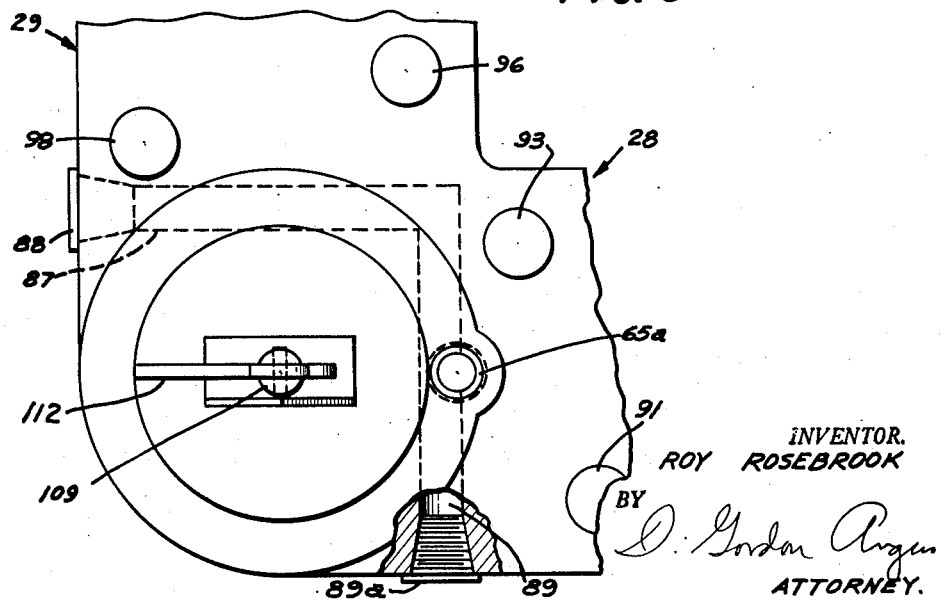

May 20, 1958

R. ROSEBROOK 2,835,466

TRACER MECHANISM

Filed Oct. 5, 1953

INVENTOR.
ROY ROSEBROOK
BY
ATTORNEY.

United States Patent Office 2,835,466
Patented May 20, 1958

2,835,466

TRACER MECHANISM

Roy Rosebrook, Monterey Park, Calif., assignor to True-Trace Corporation, El Monte, Calif., a corporation of California Application October 5, 1953, Serial No. 384,274

9 Claims. (Cl. 251—3)

This invention relates to tracer mechanisms and more particularly to a tracer mechanism for controlling hydraulic means for shifting the relative position of a tool and workpiece in response to the movement of a stylus over the surface of a pattern or template to be duplicated.

An object of this invention is to provide a tracer mechanism which is relatively simple and inexpensive as compared to other tracer mechanisms, still being accurate in its operation, and capable of directing the movement of a cutter in three dimensions.

By my invention, I provide a tracer mechanism responsive to variations in shape of a pattern in the third dimension above a lateral plane as well as in the plane itself.

A feature of my invention is the provision, in a housing, of three mutually perpendicular hydraulic control valves comprising cylinders and spools or pistons, which spools are adapted to be shifted by the movement of a pivoted, longitudinally and universally movable stylus. Such shifting directs pressurized fluid to actuating cylinders or the like through porting means so as to position a cutting tool relative to the work in response to the stylus movement in any direction, thereby duplicating the pattern or the template which is traced by the stylus.

In my co-pending application Serial Number 302,431, filed August 2, 1952, now United States Patent No. 2,753,145, I have shown a tracer mechanism for duplicating patterns in a single plane. Many of the elements of that device are included in the tracer mechanism presently to be described. The instant invention broadens the usefulness of the tracer mechanism shown in the aforesaid patent by providing for duplication of patterns in three dimensions.

The above and other features of this invention will be fully understood from the following detailed description and the accompanying drawings, of which:

Fig. 1 is a side elevation, partly in cross-section, of a tracer mechanism according to the present invention;

Fig. 2 is a top view, partly in cross-section, taken along line 2—2 of Fig. 1;

Fig. 3 is a plan view of the tracer mechanism of Fig. 1 with a fragmentary cut-out, illustrating part of a porting arrangement;

Fig. 4 is a perspective view of the universal mounting means for two spools of the tracer mechanism.

Figure 5:
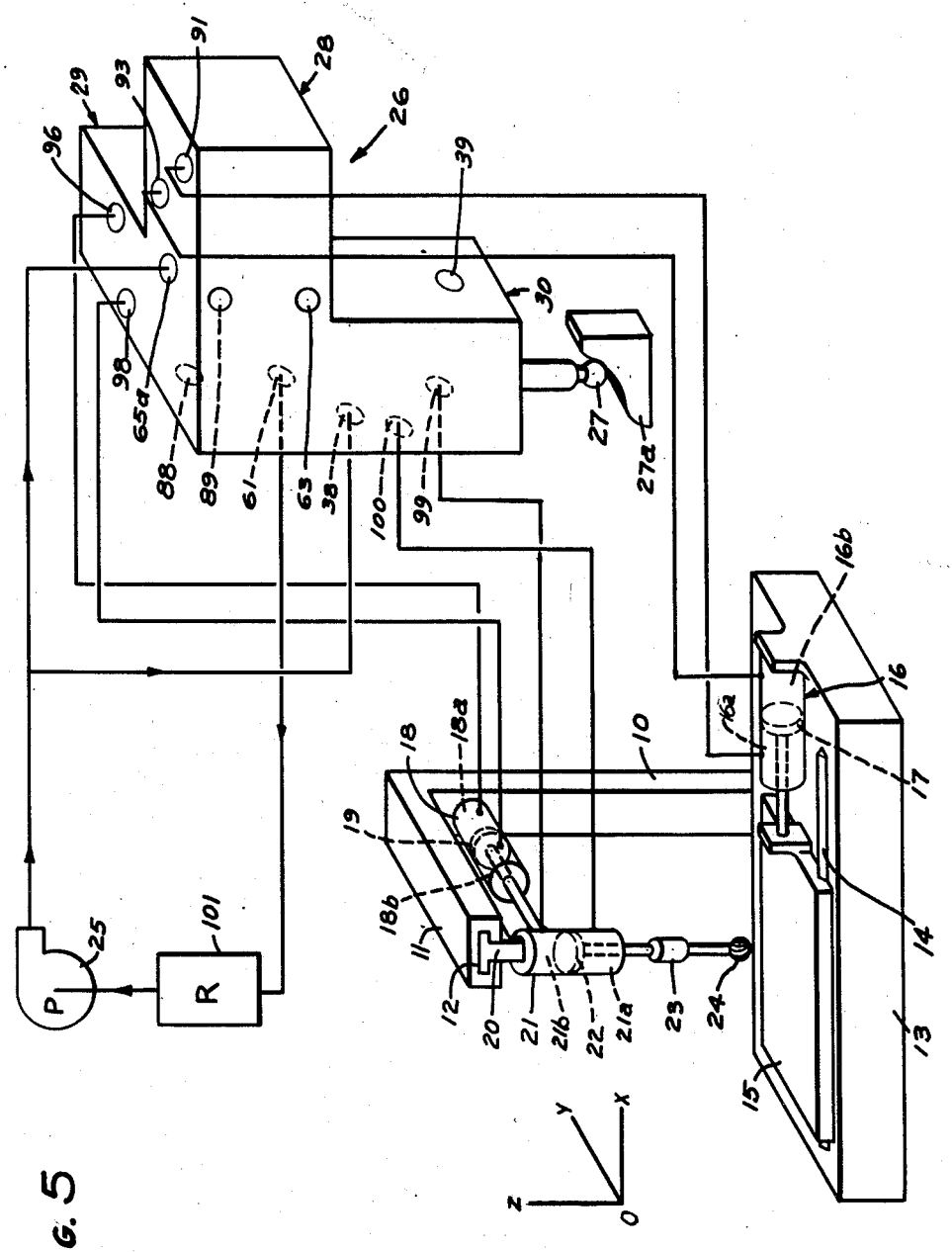
Fig. 5 is a perspective view of a milling machine, for schematically showing the relationship of the tracer mechanism and a pattern to such a duplicating machine.

Referring now to the drawings, Fig. 5 shows a profile milling machine whose cutter is adapted to be positioned with respect to the work in three dimensions. For convenience in discussion, Cartesian coordinates have been set up from an origin O, defining the X, Y, and Z axes in this perspective view.

The machine has a frame 10 with an overhanging beam 11, a keyway 12 being formed in the underside of the beam. A foundation bed 13 rests on the floor. X axis slideways 14 are laid on the bed, and an X axis carriage 15 rests upon the slideways so as to be movable back and forth in that direction. An X axis hydraulic actuating cylinder assembly 16 is fastened to the foundation bed, and is shown in cutaway view to illustrate that a piston assembly 17 divides the inner cylinder into two chambers, 16a, 16b, and is connected to the carriage so that movement of the piston in the cylinder responsive to the feeding of fluid under pressure to one part of the cylinder or the other causes the carriage 15 to move back and forth along the X axis.

A Y axis cylinder 18 is attached to the frame of the machine above the bed, with its axis perpendicular to the X axis. A Y axis piston 19 protrudes from that cylinder. A suspension key 20 adapted to slide in keyway 12 depends down from the over-hanging beam, and supports a Z axis cylinder 21 along with a Z axis piston 22 whose rod extends below it. This piston supports a power source such as an electric motor 23 which rotates a cutting tool 24. Y axis piston 19 is attached to Z axis cylinder 21 and shifts the position of that cylinder along the Y axis. Cylinders 18 and 21 are divided by their piston assemblies into chambers 18a, 18b and 21a, 21b, respectively, and introduction of pressurized fluid to the chambers will move these pistons in the same manner as the X axis piston, thereby enabling the relative position of the cutting tool and the work to be shifted along the three mutually perpendicular axes.

The amount and direction of movement of each piston is determined by the volume of the fluid which is forced into the cylinders, and by the side of the piston to which it is forced. In order to control the distance, rate, and direction of such motion, the pressurized fluid is fed from a pump 25 to the tracer mechanism of the invention, generally denoted by the numeral 26 in Fig. 5, which mechanism operates as a valve for the three cylinders. A tracer stylus 27 depends downward from the bottom of the tracer mechanism's housing. This stylus is movably mounted in the mechanism so that it can be displaced in a three-dimensional manner; that is, in any combination of movements up and down and horizontally, over the surface of a pattern 27a which is to be duplicated in the work. Such tracing operations on patterns and templates are well known, and need no detailed description here. The movement of the stylus over the surface of the pattern moves valves in the tracer mechanism and diverts the pressurized hydraulic fluid so that the cutting tool and the work will be shifted proportionately to the movement of the stylus over the pattern. There are numerous ways of interlinking the tracer mechanism with the cutting tool and work, one of which means is mounting the pattern to the machine bed and the tracer mechanism to the cutting head. Such inter-connections are not shown, since they contribute nothing to an understanding of this invention.

Referring now to Figs. 1 and 2, the tracer mechanism comprises a housing 26a having three intersecting hollow arms; X arm 28; Y arm 29; and Z arm 30, as related to the coordinate system described above, and to the direction of shifting of the tool and work which the valve in that arm controls. The housing is left open on two sides of the intersection of arms 28 and 29 in order that the internal mechanism may be reached for adjustment. The three hollow arms house the control valves.

In Z arm 30, a cylindrical sleeve 31 is pressed into the central bore 32 and forms an inner cylinder which is disposed in a substantially vertical attitude. The outer surface of the sleeve has a longitudinal groove 33 milled therein, and also has two radial holes 34, 35 at the ends of the groove which extend through the wall of the sleeve. A pressure passage 36 is drilled through the sleeve wall diametrically opposite from the longitudinal groove 33, and a drain port 37 is drilled below that groove. The sleeve is tightly and permanently held within the inner wall of central bore 32. The wall of arm 30 is tapped to form a pressure entry 38 aligned with pressure passage 36, and also a drainage connection 39 aligned with drain port 37. Two peripheral cylinder supply grooves 40, 41 are formed in the inner surface of sleeve 31, one on each side of the pressure passage 36.

A cylindrical spool 42 has an upper section closely fitting the sleeve so that hydraulic fluid under pressure will not leak between the spool and sleeve in substantial amounts. Said upper section has three annular spool grooves, 43, 44, 45 in its outer surface. Groove 44 is the center one, and regardless of the position of the spool within the sleeve (within operating limits) will always be in fluid connection with pressure passage 36. The extreme grooves 43, 45 are always in fluid communication with holes 35, 34 respectively, which connect with the longitudinal groove 33 and thence to fluid exhaust means as will later be shown. A shoulder 46 on the spool prevents the spool from ascending too far up into the sleeve, and the lower section of the spool below the shoulder is externally threaded. A longitudinal passage 47 within the spool tapers outward at its upper part, and has a frusto-conical seat 48 formed therein near the bottom of the passage 47. A retainer 49 with an interior threaded surface and an annular shoulder 50 extending inwardly is threaded onto the lower section of the spool, compressing a spring 51 and a washer 52 between the shoulder 50 and the sleeve. It also holds a retainer washer 53 that has an upper tapered seat between the annular shoulder 50 and the spool. An adjustment plug 55 has an outer threaded surface for mating with internal threads in the central bore 32 of arm 30, and has a cylindrical passage 56 through its center to pass the stylus. The upper central portion of the adjustment plug can bear against the annular shoulder 50 of the retainer, and thereby determines the lowest position of the spool in the sleeve. Lowering the adjustment plug permits the spool to slip lower in the cylinder, and the spring encourages that lower position.

The stylus 27 extends in a generally upward direction through passage 56 and the longitudinal passage 47. It has a lower depending portion 57 and first ball 58 incorporated in its length which bears against the frusto-conical seat 48 and the retainer washer 53, thereby being universally mounted. It will be observed that movement of the stylus in an upward direction moves the spool within the sleeve, and changes the alignment of the various grooves. By "universally mounted" is meant the ability of the stylus to swing in any lateral direction from its nominal central position. The ball 58 rotates as a fulcrum so that the portions of the stylus above and below it rotate around the ball as a center of rotation.

A short passage 59 is drilled at an angle in the inner wall of the arm 30 opposite hole 35. This passageway may conveniently be drilled in through the open side of the housing. An exhaust passage 60 is drilled into the housing from a threaded exhaust outlet port 61 at the approximate lower intersection of the Y and Z arms as seen in Fig. 1, and intersecting passage 62 through the inner part of the X arm meets exhaust passage 60, passage 62 being closed off at the outside of the housing by plug 63, both outlets not being needed in operation. The drilled passages shown are a practical way to construct the device. Still another passage 65 is drilled vertically, intersecting passage 62, and serves to connect groove 64 in arm 28 with the exhaust passages at the lower points in the horizontal arms. Thus Z arm exhausts to port 61 through passages 59, 62 and 60, X arm through the lower part of passage 65 and passages 62 and 60, and Y arm through its lower groove 76a (Fig. 2) and passage 60. Passage 65 also supplies fluid under pressure to the two upper arms through threaded entry port 65a.

The X axis piston divides passage 65 into two separate and disconnected parts. Flow from the upper to the lower parts of passage 65 is controlled by the X axis piston, acting as a valve.

At the level of the X and Y arms, the stylus is disposed so as to move spools therein in a horizontal direction in response to pivoting at the lower ball which is occasioned by displacement of the stylus from side to side. A second ball 66 is incorporated in the stylus at the level of the upper spools and is universally mounted so as to be free to move up and down as well as from side to side in any direction without binding. As best shown in Fig. 4, the universal mounting for this second ball comprises two U-shaped attachment members 67, 68, each having a central bight 67a, 68a and two legs 67b, 67c and 68b, 68c, respectively, which are disposed opposite each other so that the sets of legs are oppositely directed, while the central flat sections are parallel and opposite to each other, thereby forming a sort of "box" between them. A block 69 in the shape of a rectangular prism is enclosed within the two attachment members and can slide in a horizontal plane within them. The block is restrained against vertical movement by sections 67a and 68a. Examination of Fig. 4 will disclose that attachment members 67 and 68 are slidable with respect to each other since the bights bear against the block, and the legs are short enough that they do not interfere with the sliding movement. A shim or gib 70 fits between the block and one of the legs of each attachment member so that the initial position of the block may be determined. The surface of the gib which bears against block 69 is, in effect, a bearing surface on the U-shaped member which supports it. Adjustment using gibs may be had by means of set screws 72 which are reached through the open sides of the housing. The gibs may be of various sizes, and placed on either side of the block, or both, to give any desired initial adjustment. The gib also provides a "take-up" to compensate for wear. The walls of the block, and the inner surfaces of the legs, are bearing surfaces in bearing relationship. The term "bearing relationship" as used herein denotes a relationship in which the adjacent exterior and interior bearing surfaces are restrained against relative lateral movement; that is, from getting closer to each other, but can move relative to each other in a parallel manner. A special case of this bearing relationship is shown in the drawings, wherein the adjacent bearing surfaces engage each other in sliding contact.

A hole 73 is drilled upward through the universal mounting means described to accommodate the second ball and allow the upper end of the stylus to protrude therefrom. This allows the second ball to move in a vertical direction therein without impediment or rigid attachment to the spools. Free sliding movement of the ball avoids any binding or bending of valve components. The spool valves are freely slidable without side loads from the stylus. In addition, unlike any known tracer valves, no physical deformation of any valve component is needed to move the valve spools. Such deformations ordinarily result in aberrations in the shape of the finished product from that of the pattern.

The arms 28 and 29 are similar in construction, and the description of the X arm 28 will suffice to describe Y arm 29 as well. Arm 28 has a central bore 74 in which a sleeve 75 is fixed. This sleeve has a longitudinal groove 64 at its outer bottom which makes fluid connection with exhaust passage 65 below the sleeve. Two holes 77a, 77b are drilled through the wall of the sleeve to interconnect with the groove 64. A hole 78 for pressurized fluid is drilled through the wall diametrically opposite holes 77a and 77b which interconnects with an upper longitudinal groove 79 which itself makes contact with supply passage 65 and supply port 65a. Two annular sleeve grooves 80, 81 are disposed on opposite sides of the pressure inlet hole 78 and between holes 77a and 77b in the sleeve.

A cylindrical piston or second spool 82 makes a close sliding fit with the interior of the sleeve. This spool has fluid retainer rings 83 surrounding it at its inner end, and three annular spool grooves 84, 85, 86. The middle groove 85 is always in fluid connection with the pressure inlet hole 78 within operating limits and the outer (or end) grooves 84, 86 are always in fluid connection with outlet connections 77a and 77b respectively. The piston itself is connected to the universal mounting by being threaded into leg 67c. Thus, movement of the stylus in the X axis moves piston 82 inside the X arm.

The Y arm is similarly constructed, and will not be described in complete detail. Its pressure inlet is provided from inlet port 65a, through an upper pressure passage 87 (capped off by plug 88 at the surface of the housing) which intersects another passageway 89 drilled at right angles to it and plugged at its outer end by plug 89a. Passageways 87 and 89 are fluidly interconnected with pressure entry port 65a. The Y arm has a groove (not shown) similar to groove 79 in the X arm to carry the fluid to a pressure entry hole in the sleeve. A lower longitudinal groove 76a similar to groove 64 of the X arm is in the Y arm, connecting with exhaust passage 60. A third piston, the Y axis spool 116 is axially shiftable in the Y axis sleeve. Its end is shown in Fig. 1.

In order to convey pressurized fluids to the cylinders and remove exhaust fluids from them, the following conduits are formed in the various arms, which intersect the edges of certain sleeves. In the X arm, conduit 91 (see Fig. 2) passes through the wall of the housing and meets passage 92 in the sleeve 75, which goes through the sleeve wall and connects with groove 81. Conduit 93 through the housing makes the same kind of connection with groove 80 via passage 94 in the sleeve. In the Y arm, passage 95 interconnects the outer groove in the Y arm sleeve with conduit 96, and passage 97 interconnects the inner groove with conduit 98. The passages are drilled through the housing off center, and therefrom show in the cross-sectional view as half-circles in the housing wall, in which manner they leave cavities for interconnection with the passages in the sleeves. Due to the nature of the sections showing the Z arm, all the similar conduits in that arm do not appear in the drawings. However, a conduit 99, the outlet of which shows in Fig. 5 interconnects with groove 41, and a conduit 100 connects with groove 40, in the same manner.

The hydraulic interconnection between the pump, valves and machine are as follows: tracer mechanism exhaust 61–reservoir 101; reservoir-pump; pump 25–inlets 65a and 38; conduit 99–chamber 21b; conduit 100–chamber 21a; conduit 91–chamber 16a; conduit 93–chamber 16b; conduit 96–chamber 18a; and conduit 98–chamber 18b.

A traverse rate control mechanism, incorporating a rapid traverse feature, is disposed at the upper part of the housing. The top end of the stylus has a third ball 102 as a part thereof, spaced from the second ball 66 and which fits within a channel 103 formed in a body 104. The body has a frusto-conical surface 105 at its top, and an annular shoulder 106 at its base. This body rests upon a cup shaped member 107 which is threadably engaged to a cap 108 screwed into the housing. A pin 109 passes through the cap, having a conical surface 110 in its head. The frusto-conical surface 110 matches the frusto-conical surface 105. One of these two surfaces is convex, and the other is concave. Both are non-planar. In addition, it will be seen that one of the said surfaces extends into an opening in the object having the other surface, and that the opening has a cross-section of the same cross-section as that of the body entering it. In the illustrated example, the conical surface 110 terminates as a circle at its lowest level, and the cross-section of surface 105 is also a circle. This pin is pressed downward toward the body by a spring 111. At the top of the cap, a cam device 112 is pivotally pinned to the pin, the turning of which varies the spacing between the machine conical surfaces, and also the spacing between the pin and the top of the longitudinally movable stylus. The initial spacing is determined by the distance which cap 108 is threaded into the top, and further adjustments during operation are made with the cam device. The body 104 is always to be slidable between these two members, the pin being the limitation on the stylus' movement.

The terms "piston" and "spool" have been used interchangeably in this specification and in the accompanying claims, to denote the first piston (or spool) 42 in the Z axis, the second piston (or spool) 82 in the X axis, and the third piston (or spool) 116 in the Y axis.

A typical series of operations utilizing this tracer mechanism will now be described. Assume that the tracing mechanism is first to rout out the general shape of a template in a single horizontal plane. This will require the cooperation of the X and Y arms and their associated valves and cylinders. Suppose that the first movement of the cutting tool required is to the right along the X axis. The stylus tip is brought into contact with the template edge extending in that direction and moved to the right. This pivots the stylus at the lower ball 58 and shifts the upper ball 66 to the left as seen in Fig. 1. This causes the upper ball to move to a slightly lower level, but it is slidable in its channel, so there is no deformation of component parts. This averts the abberation found in some prior hydraulic control devices. Spool 82 moves to the left with its universal mounting means and this causes pressurized fluid from inlet port 65a, upper passage 65, groove 79, and passage 78 to flow through spool groove 85 to sleeve groove 80, through passage 94 (see Fig. 2), out conduit 93 and into the chamber 16b, moving the work table to the left, and therefore the cutting tool relatively to the right with respect to the work. At the same time, fluid must be exhausted from chamber 16a, and it flows from that chamber to conduit 91, passage 92 in the sleeve, to sleeve groove 81, now in registration with spool groove 86, through passage 77b (see Fig. 1) to groove 64, to the lower portion of passage 65, passage 62, passage 60, out port 61 and then finally to reservoir 101.

Had movement to the left been indicated, the stylus would have been moved to the left, and the spool displaced to the right. This would have moved spool groove 85 (which is always under pressure from passage 78 regardless of the spool position within operating ranges) into registration with sleeve groove 81, since the shoulder between the piston grooves ceases to cut off flow between them. Then pressurized fluid flows from groove 81 through passage 92, out conduit 91 to chamber 16a, moving the table to the right. This table movement moves the tool relatively to the left of the workpiece. Exhaust fluid from chamber 16b would flow to conduit 93, passage 94, sleeve groove 84, passage 77a, groove 64, the lower portion of passage 65, passage 62, passage 60, out port 61 and thence to reservoir 101.

The flow pattern for tracing in the Y axis is substantially the same, except that the spool in that axis will be moved by displacing the stylus perpendicularly to the X axis. For movement away from the viewer of Fig. 5, the stylus is pushed in the sense of toward the paper in Fig. 1. As seen in Fig. 2, the Y axis spool will move downward. This places conduit 98 under pressure, which pressurizes chamber 18b, moving cylinder 21 with the cutting tool. Port 96 receives the exhaust from chamber 18a, returning it through the tracer mechanism through port 61 to reservoir. Movement in the other Y direction reverses this arrangement.

Because of the universal mounting means, motion may be solely in either the X axis or Y axis, or in any combination of the two, and thus diagonal traces may also be made. All three balls on the stylus have the property of "universal rotation." By this is meant the ability of the balls to rotate around any "horizontal" axis. The term "horizontal" relates to the XY plane as defined in the drawings, rather than any particular orientation in space. Such a horizontal axis is therefore contained in the XY plane. By virtue of this arrangement, the stylus is rotatable around the first ball, and the second and third balls rotate within their associated structures. The stylus can therefore pivot away from its neutral position in any direction. When the stylus rotates around the first ball, the vertical height of the second and third balls vary, but because they are freely slidable, no side loads are imposed on members to which they are connected.

When a three-dimensional trace is to be made, the spool in the Z arm is used. It will be seen that pressure is supplied to this arm separately from the other two arms, although it uses the same common exhaust passages as the others. Pressure enters through port 38 to passage 36, and maintains spool groove 44 under pressure at all times. In Fig. 1, the spool is shown in a central position, it being understood that the stylus may be moved either up or down from the illustrated position. The Z axis spool and the stylus have a tendency to fall down to rest on plug 55. This has a tendency to cause the tool to approach the work, and the stylus to approach the template. Contact between the stylus and the template will tend to move the spool upward to the illustrated neutral position. Thus the stylus will seek the surface of a template when the template sinks away from it, and will be placed in a neutral condition when the stylus and the template are so disposed that the cutting tool and workpiece are correctly related in the Z axis.

When the tool is tracing a three-dimensional pattern, the stylus is moved to contact the surface, and thus displaces the spool. Assume for a moment that the movement is to be downward. Then the spool moves down by stylus weight and spring force. Fluid pressure from spool groove 44 is fed to sleeve groove 41. By means not shown, this fluid reaches outlet 99 and then goes to chamber 21b which causes the cutting tool to move downward. Fluid flows from chamber 21a to conduit 100, and by means not shown, to sleeve groove 40, thence to spool groove 43, passage 35, passage 59, passages 62 and 60, and out port 61 to reservoir. Upward movement of the stylus reverses this arrangement, the spool being moved upwardly so that spool groove 44 makes fluid communication with sleeve groove 40, and thence the pressurized fluid flows to conduit 100, and chamber 21a, moving the cutting tool upward. Exhaust fluid from chamber 21b flows back to conduit 99, sleeve groove 41, spool groove 45, passage 34, groove 33, passages 59, 62 and 60, and out port 61 to reservoir. Up and down movement of the stylus is independent of the X and Y spools, due to the slidable mounting of the upper ball in the universal mounting means. It therefore follows that in addition to any compound movement in a lateral plane, any compound movement incorporating a third dimension may be had.

Since fluid will collect in the lowest part, the drain port 39 may be maintained under a slight vacuum to minimize drainage onto the machine. An O ring 115 retains most of the fluid in the valve.

The speed with which the tool traverses the work depends on the rate of flow of pressurized fluid to the actuating cylinders. This, in turn, depends on the distance the spools are moved in the sleeves, since the fluid flow per unit time when the grooves are relatively more aligned will be greater than if they are only slightly aligned. An unlimited traverse rate, resulting in too rapid a feed rate to the cutting tool is not allowable in a machine tool. However, there are circumstances such as may occur in machine set-up, where a rapid traverse movement is desirable. Also, it is desirable that the maximum rates for a given set up be variable.

For these reasons, the body 104 is adapted to be slid from side to side by the third ball 102. At either end of the travel of the body, its upper conical surface strikes the matching surface on the pin 109. It will be seen that the closer the pin is to the body, the less side-to-side movement is permitted to the stylus, and this forms a limitation on its movement of the horizontal pistons. If a greater movement is desired, the cam device is rotated, and the pin lifted against the spring 111. Then a greater sidewise movement may result. This device also provides for the same control of vertical movement, although such vertical control is usually less important than the sidewise limitation. In this case, the upper part of the third ball 102 will strike the head of the pin, and lifting the pin permits greater vertical stylus displacement. Downward displacement is limited by retainer 55, which may be set by simply screwing it in or out by the threads. The frusto-conical surface 105 is, for practical purposes "on" the stylus, inasmuch as the body 104 is in bearing contact with ball 102 so as to be moved sideward along with the ball.

From the above description, it will be understood how the tracer mechanism, which moves relative to the pattern or template as the machine moves relative to the work, operates to shift the tool and the work. The maximum rate of traverse is first determined and the setting of the head accomplished as indicated above. Then the stylus point 27 is brought into contact with the surface of the template to be duplicated. After the initial contact, the operator moves the stylus over the surface of the template or pattern. This movement displaces one, two, or all three spools along their axes in any combination of directions, and the valving arrangement thereupon acts to move the work and tool so that the spools tend to become centered again, at which time there is no further flow to any of the cylinders. This device operates, in short, by hunting to move the tool and work and tracer mechanism into an equilibrium position wherein all the spools are centered. Displacement of the stylus in operation causes the machine and tool to shift in a movement which tends to center the device again, and movement ceases if and when that condition is attained. The rate of hunting is determined by the traverse limitation. For tracing patterns, the operator simply moves the stylus along the surface in a number of line traces in any direction, and the work and tool shift to duplicate his movement.

Depending on the manner of connecting the tracer and the machine, the work produced may be of the same size or of some proportional size as related to the pattern, thus operating as a pantograph.

This tracer mechanism is a simple, self-contained three-dimension control means for cylinders or fluid motors, and is simple in construction and accurate in operation.

My invention is not to be construed as limited to the particular embodiment illustrated in the drawings and described in the description, which is given by way of illustration rather than of limitation, and the invention is not limited except in accordance with the scope of the appended claims.

I claim:

1. A tracer mechanism comprising a housing, a tracer stylus having a longitudinal axis and mounted within the housing, a first ball included in the stylus at an intermediate position of its longitudinal length, the stylus having a portion extending beyond the housing, the end of said portion being adapted to engage a pattern to be traced, a second ball included in the stylus at a position of its longitudinal length on the opposite side of the first ball from said portion, hydraulic fluid valve means comprising a first substantially vertical cylinder, second and third cylinders disposed horizontally, being mutually perpendicular to each other and to the first cylinder, and first, second and third reciprocating pistons respectively disposed in the first, second and third cylinders, movable axially therein, port means formed in the respective cylinders, said pistons arranged to register in different combinations with the port means at different piston positions, said port means having communication with respective fluid passages in the housing, means for mounting the first ball on the stylus to the first piston whereby the ball is possessed of universal rotation and the said portion of the stylus is thereby adapted for pendular motion, and movement of the stylus along its longitudinal axis shifts said first piston in the first cylinder, means for mounting the second and third pistons to said second ball whereby said second ball has universal rotation, tained. The rate of hunting is determined by the traverse and its lateral movement in response to movement of the stylus causes corresponding lateral movement of the second and third pistons, whereby the flow of fluid through the housing is controlled by the position of the pistons as determined by the stylus positions.

2. Apparatus according to claim 1 in which means permitting rapid traverse in any dimension is associated with the stylus, said means comprising a body shiftable in any direction in a plane which is generally transverse to the longitudinal axis of the stylus and restrained from movement generally parallel to the longitudinal axis of the stylus and having an upper frusto-conical surface and a central bore therethrough, and a third ball included in the stylus at its upper end which third ball fits in said central bore having universal rotation and bearing against said body in said central bore, and a pin located above the stylus having an axis co-linear with said longitudinal axis, a head on said pin having a mating conical surface spaced from the first-mentioned conical surface and adapted to engage same to limit sideward movement of the body and adapted to engage the stylus to limit longitudinal movement of the stylus, whereby lateral movement of the said third ball shifts said body transverse to said longitudinal axis, the lateral movement being limited by engagement of said conical surfaces, longitudinal stylus movement toward the pin being limited by the contact of the stylus with the pin, and means for retracting the pin whereby the amount of permissible stylus movement before contact between body and pin and third ball and pin may be varied.

3. Apparatus according to claim 1 in which the means for mounting the first ball to the first piston comprises a seat in the first piston against which said first ball is adapted to bear, a retainer having a seat adapted to press against the opposite side of the said first ball from the afore-mentioned seat and means affixed to the said piston for holding said retainer against said first ball, whereby the said first ball is held in contact with the said two seats so as to move axially with the said first piston and to be universally rotatable with respect to said first piston.

4. Apparatus according to claim 1 in which the cylinders comprise sleeves within which the pistons reciprocate and in which the port means for each cylinder and piston assembly comprise three annular piston grooves in the piston, and two annular sleeve grooves and a pressure entry in the cylinder facing the piston so disposed and arranged that at a first middle piston position, the pressure entry aligns with the middle annular piston groove, and no other grooves are in substantial alignment, and at any substantially different second position, one of the sleeve grooves aligns with the middle piston groove, and the other sleeve groove aligns with one of the other piston grooves, said fluid passages including outlets from the housing connected to each of said sleeve grooves and also a pair of exhaust passages, the two sleeve grooves being between the exhaust passages, one of said exhaust passages being in fluid communication with one of the end piston grooves in said second position, each cylinder having a set of port means and fluid passages as defined herein.

5. Apparatus according to claim 1 in which the means for mounting the second and third pistons to said second ball comprises a device having sidewalls laterally enclosing and in contact with said second ball permitting rotation of the second ball around any horizontal axis thereof within said sidewalls, said sidewalls having exterior bearing surfaces in planes extending in the directions of movement of the second and third pistons, and bearing means attached to each of said second and third pistons having bearing surfaces which engage the bearing surfaces of said lateral walls to permit relative sliding between the two last-mentioned bearing surfaces in the directions of movement of the second and third pistons, whereby lateral movement of the second ball in response to pendular movement of the stylus causes corresponding lateral movement of the second and third pistons.

6. Apparatus according to claim 1 in which the means for mounting the second and third pistons to said second ball comprises a device having sidewalls laterally enclosing and in contact with said second ball, permitting rotation of said second ball around any horizontal axis thereof within said sidewalls, said sidewalls having exterior bearing surfaces extending in the direction of movement of the second and third pistons, and bearing means attached to each of said second and third pistons, having bearing surfaces which also extend in the direction of movement of the said second and third pistons, said bearing surfaces being in bearing relationship with the exterior bearing surface of the side walls, thereby providing for relative parallel movement and preventing relative lateral movement between adjacent bearing surfaces of the bearing means and exterior bearing surface of the side walls, in the directions of movement of the second and third pistons, whereby lateral movement of the second ball in response to pendular movement of the stylus causes corresponding lateral movement of the second and third pistons.

7. Apparatus according to claim 1 in which the means for mounting the second and third pistons to said second ball comprises two U-shaped members each having parallel legs with parallel inner walls and a bight joining said legs, said bights each having a hole therethrough, a block in the shape of a rectangular parallelepiped having a hole therethrough, said block being enclosed by the U-shaped members so that the holes in the bights and the block are aligned, the bights of the U-shaped members being crossed and spaced from each other so as to hold the block between them with the inner walls of the legs bearing against the sides of the block, said second ball being disposed in the hole in the block, the second piston being attached to a leg of one of the U-shaped members, and the third piston being attached to a leg of the other of the U-shaped members, so that each piston is perpendicular to the inner walls of the legs of the U-shaped member to which it is attached, said block and U-shaped members thereby permitting relative sliding between themselves, in the directions of movement of the respective pistons, whereby lateral movement of the stylus causes corresponding lateral movement of the second and third pistons.

8. A tracer mechanism comprising a housing, a tracer stylus having a longitudinal axis and mounted within the housing and a first ball included in the stylus, the stylus having a portion extending beyond the housing, the end of said portion being adapted to engage a pattern to be traced, a second ball spaced from said first ball and included in the stylus, hydraulic fluid valve means comprising a first substantially vertical cylinder, second and third cylinders disposed horizontally, the three cylinders being mutually perpendicular to each other, and first, second and third reciprocating pistons respectively disposed in the first, second and third cylinders, movable axially therein, and port means formed in the respective cylinders and pistons arranged to register in different combination at different piston positions, said port means having communication with respective fluid passages in the housing, means for mounting the first ball on the stylus to the first piston whereby the ball is possessed of universal rotation, and the lower end of the stylus is thereby adapted for pendular motion, and movement of the stylus along its longitudinal axis shifts said first piston in the first cylinder, means for mounting the second and third pistons to said second ball whereby said second ball has universal rotation, and its lateral movement in response to movement of the stylus causes corresponding lateral movement of the second and third pistons, whereby the flow of fluid through the housing is controlled by the position of the pistons as determined by the stylus position.

9. Apparatus according to claim 8 in which means permitting rapid traverse in any dimension is associated with the stylus, said means comprising a body shiftable in a direction generally transverse to the longitudinal axis of the stylus, and restrained from movement in a direction generally parallel to the longitudinal axis of the stylus, and having an upper frusto-conical surface and a central bore therethrough, and a third ball included in the stylus at its upper end which third ball fits in said central bore and is universally rotatable therein, and a pin located above the stylus having an axis co-linear with said longitudinal axis, a head on said pin having a mating conical surface spaced from the first-mentioned conical surface and adapted to engage same to limit longitudinal movement of the stylus and sideward movement of the body, whereby lateral movement of the said third ball shifts said body transverse to said longitudinal axis, the lateral movement being limited by engagement of said conical surfaces, the longitudinal stylus movement toward said pin being limited by the contact of the stylus with the pin, and means for retracting the pin whereby the amount of movement permitted the stylus before contact between body and pin and third ball and pin may be varied.

References Cited in the file of this patent

UNITED STATES PATENTS

| | | |
|---|---|---|
| 2,332,532 | Roehm | Oct. 26, 1943 |
| 2,433,005 | Turchan | Dec. 23, 1947 |
| 2,436,373 | Barnes | Feb. 24, 1948 |
| 2,612,184 | Evans | Sept. 30, 1952 |

UNITED STATES PATENT OFFICE
CERTIFICATE OF CORRECTION

Patent No. 2,835,466                                                       May 20, 1958

Roy Rosebrook

It is hereby certified that error appears in the printed specification of the above numbered patent requiring correction and that the said Letters Patent should read as corrected below.

Column 5, line 38, for "therefrom" read -- therefore --; column 9, line 10, strike out "tained. The rate of hunting is determined by the traverse"; line 46, after "seat" insert a comma.

Signed and sealed this 24th day of February 1959.

(SEAL)
Attest:

KARL H. AXLINE                                              ROBERT C. WATSON
Attesting Officer                                         Commissioner of Patents